United States Patent [19]

Nakagawa et al.

[11] 4,343,553
[45] Aug. 10, 1982

[54] SHAPE TESTING APPARATUS

[75] Inventors: Yasuo Nakagawa; Hiroshi Makihira, both of Yokohama; Yoshitada Oshida, Fujisawa; Nobuyuki Akiyama, Yokohama, all of Japan

[73] Assignee: Hitachi, Ltd., Tokyo, Japan

[21] Appl. No.: 181,768

[22] Filed: Aug. 27, 1980

[30] Foreign Application Priority Data

Sep. 3, 1979 [JP] Japan .................................. 54/111706
Nov. 14, 1979 [JP] Japan .................................. 54/146427
Aug. 6, 1980 [JP] Japan .................................. 55/107193

[51] Int. Cl.³ ............................................. G01B 11/00
[52] U.S. Cl. .................................... 356/376; 250/560; 358/101
[58] Field of Search ................ 356/376, 394; 250/202, 250/560; 358/96, 101

[56] References Cited

U.S. PATENT DOCUMENTS

3,706,851 12/1972 Froehlich et al. ..................... 358/96
4,242,702 12/1980 Kuni et al. ........................... 358/106
4,277,175 7/1981 Karasaki et al. ..................... 356/394

Primary Examiner—R. A. Rosenberger
Attorney, Agent, or Firm—Craig and Antonelli

[57] ABSTRACT

A shape detecting apparatus comprises a slit projecting means for projecting a slit image on a three-dimensional object such as a soldered area, a positioning means for positioning the three-dimensional object relative to the slit projecting means, an image pickup means for two-dimensionally scanning the slit image projected by the slit projecting means to pickup the image, a light segment extracting circuit including a center position extracting means for extracting a mean position $(Z_1+Z_2)/2$ of two position signals $Z_1$ and $Z_2$ at which a video signal derived by transversely scanning the slit image by the image pickup means corresponds, to a first higher reference $V_1$ when the video signal exceeds the first higher reference $V_1$, a maximum value position extracting circuit for extracting a position Z corresponding to a maximum value of the video signal when the maximum value of the video signal is no higher than the first higher reference $V_1$ and exceeds a second lower reference $V_2$ and an erasing means for erasing the position signal when the maximum value of the video signal is no higher than the second lower reference $V_2$, and a detecting means for detecting undersoldered condition and oversoldered condition by analyzing and evaluating the three-dimensional object based on the light segment position information derived from the light segment extracting circuit.

6 Claims, 21 Drawing Figures

SHAPE TESTING APPARATUS

BACKGROUND OF THE INVENTION

The present invention relates to a three-dimensional shape detecting apparatus utilizing a light segmenting method for testing if there is a defect in soldered areas of a printed circuit board, such as imperfect soldering, oversoldering or pinhole, if a bump in LSI bonding process is proper or not, or if circuit components or IC chips are mounted on a substrate with a proper orientation and at a proper position.

Heretofore, when the shape of a miniature three-dimensional object of an industrial product having a miniature three-dimensional shape on a plane such as a soldered area on a printed circuit board, a component mounted on the printed circuit board or a bump in a LSI bonding process is to be examined, an operator views by his eyes directly or through a magnifying lense or a stereoscopic microscope. However, since the soldered area on the printed circuit board has a three-dimensional shape and unstable surface condition such as glaze on the surface or partial blue, it is difficult to examine in a stable manner and failure of detection and difference of determination criterion among the operators have been unavoidable. As to the component mounted on the printed circuit board, it also has a three-dimensional shape and in addition has a surface of mixture of various reflection coefficients, and hence the stable examination has not been attained.

The Japanese Published Unexamined Patent Application No. 48-7764 disclose a light segmenting method in which a brightest point in a video signal produced by a television camera is detected. However, this method cannot exactly detect a three-dimensional shape. The Japanese Published Unexamined Patent Application No. 49-39445 disclose a light segmenting method in which a video signal produced by a television camera is digitized. This method also cannot exactly detect the three-dimensional shape.

SUMMARY OF THE INVENTION

It is an object of the present invention to provide a shape detecting apparatus which uses the light segmenting method to exactly examine the shape of an object having a surface including a mixture of various glazing areas and a three-dimensional shape such as a soldered area on a printed circuit board or a circuit component (e.g. resistor or capacitor) which is mounted on a printed circuit board by adhesive material or the like.

In order to attain the above object, according to the present invention, a shape detecting apparatus is provided which comprises a slit means for projecting a slit image on a three-dimensional object, a positioning means for positioning the three-dimensional object relative to the slit projecting means, an image pickup means for two-dimensionally scanning the slit image projected by the slit projecting means, a light segment extracting circuit including a center position extracting means for extracting a mean position $(Z_1+Z_2)/2$ of two position signals $Z_1$ and $Z_2$ at which a video signal derived by transversely scanning the slit image by the image pickup means corresponds to a first higher reference $V_1$ when a maximum value of the video signal exceeds the first higher reference $V_1$, a maximum position extracting means for extracting a position corresponding to the maximum value of the video signal when the maximum value of the video signal is no higher than the first higher reference $V_1$ and exceeds a second lower reference $V_2$ and an erasing means for erasing the position signal when the maximum value of the video signal is no higher than the second lower reference $V_2$, and a detecting means for analyzing and evaluating the three-dimensional object based on light segment position information derived from the light segment extracting circuit. According to another aspect of the present invention, a shape detecting apparatus is provided in which the slit projecting means is arranged to project the slit image on the three-dimensional object perpendicularly thereto so that a dead angle compensation is effected and a first image pickup means and a second image pickup means are arranged to pick up images obliquely on both sides of the center of the slit projecting means.

DETAILED DESCRIPTION OF THE PREFERRED EMBODIMENTS

Figures 1, 2:
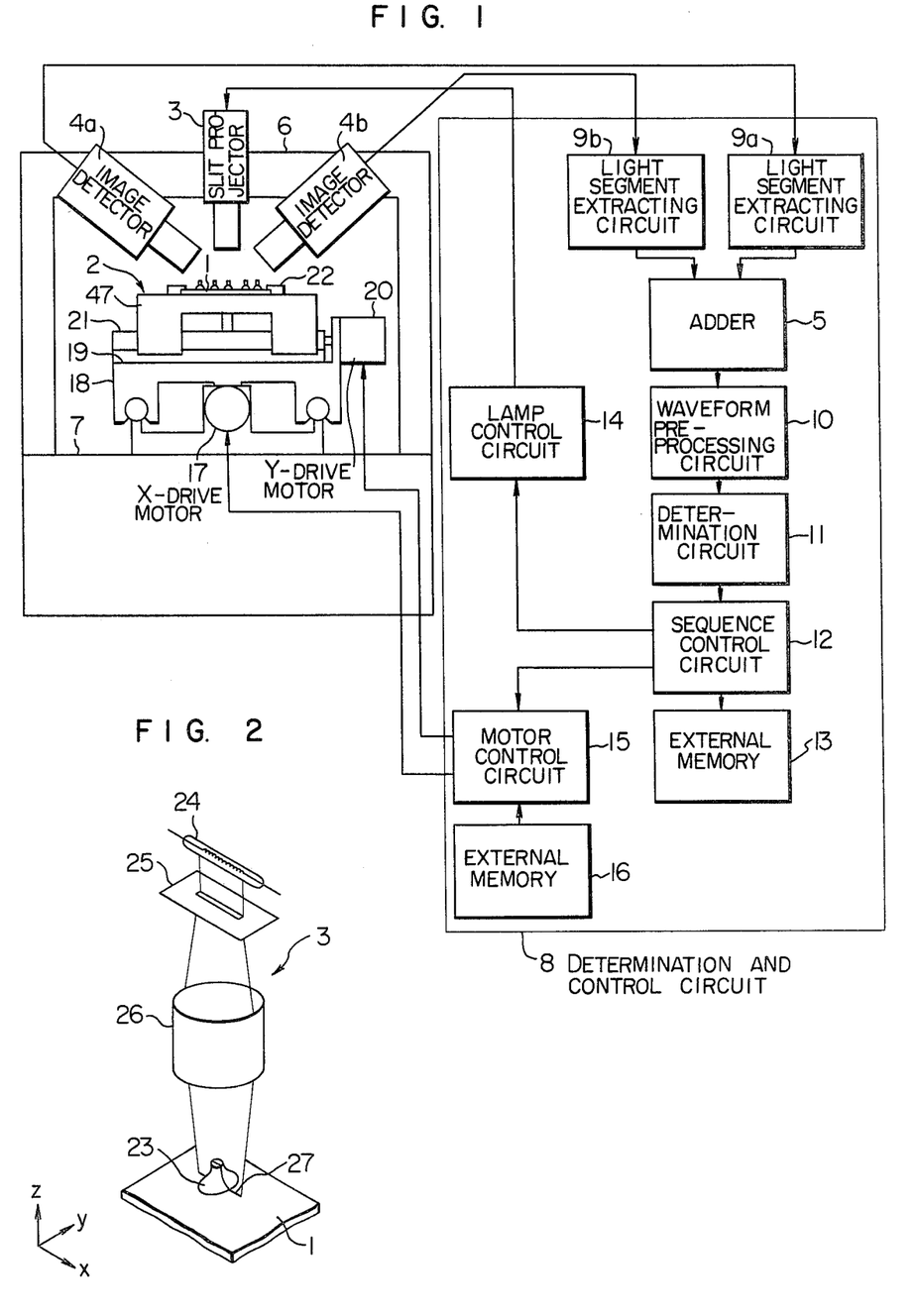
FIG. 1 shows a schematic arrangement of one embodiment of a shape detecting apparatus of the present invention.
FIG. 2 shows a slit projector shown in FIG. 1.

FIG. 1 shows a schematic arrangement of one embodiment of a testing apparatus for a three-dimensional object in accordance with the present invention. As an example of the three-dimensional object to be tested, a soldered area on a lead wire of an IC chip mounted on a printed circuit board is considered. The testing apparatus comprises an X-Y table on which a printed circuit board 1 is mounted, a slit projector 3 for projecting slit light image perpendicularly to a soldered area of the printed circuit board, a pair of image detectors 4a and 4b which are arranged to prevent dead angle, a head holding structure 6 for holding the image detectors 4a and 4b, a base 7 and a determination and control circuit 8, which comprises light segments extracting circuits 9a and 9b, an adder circuit 5, a waveform preprocessing circuit 10, a determination circuit 11, a sequence control circuit 12, an external memory 13, a lamp control circuit 14, a motor control circuit 15 and an external memory 16. The X-Y table 2 comprises an X drive motor 17, an X-feeding mechanism 18, an X feeding mechanism (not shown) including, an X-lead screw and a nut, an X-table 19, a Y-drive motor 20, a Y sliding mechanism 21, a Y-feeding mechanism (not shown) including a Y-lead screw and a nut, a Y-table 47 and a printed circuit board holding and positioning mechanism 22. The printed circuit board 1 is carried on the X-Y table 2 manually or by an automatic carrying mechanism, not shown and it is positioned and held in place by the holding and positioning mechanism 22. The X-Y table 2 is positioned under the control of the motor control circuit 15 to a position previously set in the external memory 16 in accordance with a timing specified by the sequence control circuit 12. The external memory 16 may be a cassette magnetic tape, a flopping disk or a paper tape in which X-Y coordinates of the soldered areas on the printed circuit board to be tested are sequentially stored. The X-Y table 2 sequentially moves and then stops in accordance with the stored coordinate data. As shown in more detail in FIG. 2, the slit projector 3 projects the slit light onto a soldered area 23 on the printed circuit board 1 which is positioned directly therebelow by the X-Y table 2. The slit projector 3 may comprise a lamp 24, a slit 25 and an imaging lens 26, and it projects an image 27 of the slit 25 which is illuminated by the lamp 24 onto the soldered area 23 and focuses the image thereon through the imaging lens 26.

When an object having a complex and uneven shape such as the soldered area 23 having a projecting lead wire is examined by the light segmenting method, a dead angle may present. Accordingly, as described above, the slit light is projected from the top of the soldered area 23 and the resulting slit image 27 is detected by the image detectors 4a and 4b obliquely on both sides and the resulting detection signals are added together to produce a combined light segment signal. In this manner, the dead angle is compensated to enable the examination of the three-dimensional shape of the soldered area 23. The image detectors 4a and 4b may be image pickup device such as imaging lenses and TV cameras, imaging lenses, image scanners such as galvanomirrors and one-dimensional self-scan type image pickup elements, or image lenses and two-dimensional self-scan type image pickup elements.

Figure 3A:
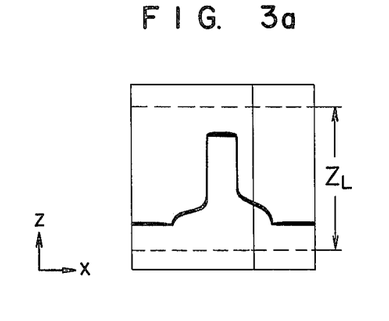
FIG. 3a shows a detected slit image.
Figure 3B:
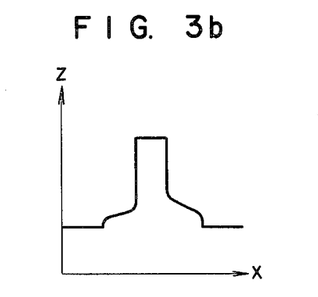
FIG. 3b shows extracted light segments.

FIG. 3a shows a light segment image detected by the image detector 4a or 4b. In FIG. 3a, it is assumed that dark areas correspond to actually bright areas and produce high voltages in the video signal output.

In order to automatically and exactly test the soldered area 23 to determine if there is a defect such as imperfect soldering, pinhole or oversoldering, it is necessary to exactly extract a one-dimension light segment from the two-dimension picture image (light segment) having dark and bright areas detected by the image detectors 4a and 4b. However, the soldered area 23 may have a protruding lead wire which makes a dead angle or partly changes a reflection coefficient, or it may have partial glazing areas which are oriented to reflect the projected light to the image detector 4a or 4b. Even with such soldered area 23, the one dimension light segment must be exactly extracted. The one dimension light segment extracting circuits 9a and 9b are now explained.

Figure 4:
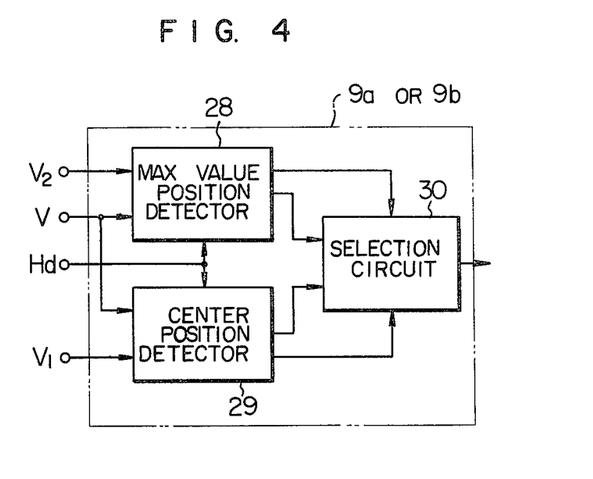
FIG. 4 shows a schematic diagram of a light segment extracting circuit shown in FIG. 1.

The light segment extracting circuits 9a and 9b each receives the video signal V from the image detector 4a or 4b, reference signals $V_1$ and $V_2$ ($V_1 > V_2$) and a triggering signal Hd of each horizontal scan of the image detector 4a or 4b (a horizontal synchronizing signal for a TV camera) and it comprises a maximum value position detection circuit 28, a center position detection circuit 29 and a selection circuit 30.

Figure 5A:
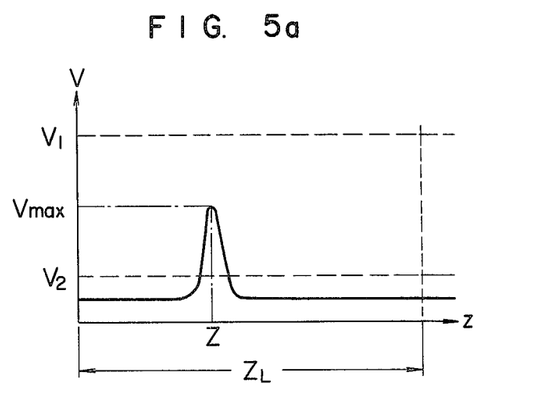
FIGS. 5a and 5b illustrate function of the circuit of FIG. 4.
Figure 5B:
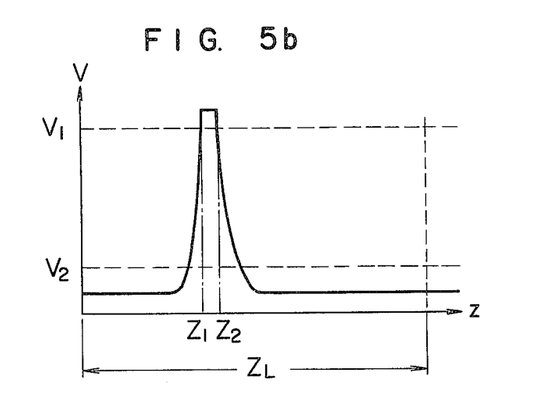

The function of the light segment extracting circuit is illustrated in FIGS. 5a and 5b. In FIG. 5a where a maximum value $V_{max}$ of the video signal is within a range defined by the first and second references $V_1$ and $V_2$, a z-coodinate position Z is determined by the maximum value position detection circuit 28. When $V_{max}$ is higher than $V_1$ (FIG. 5b), a z-coordinate position $Z_1$ at which V first becomes equal to $V_1$ and a z-coodinate position $Z_2$ at which V last becomes equal to $V_1$ are determined by the center position detection circuit 29 which further calculates $Z=(Z_1+Z_2)/2$ to determine the center position. When V exceed $V_1$ in the circuit 29 during one scan period, the selection circuit 30 selects the output of the circuit 29, and when V does not exceed $V_1$ the selection circuit 30 selects the output of the circuit 28, as the light segment position. When V does not exceeds $V_2$ during one scan period, the selection circuit 9 produces a zero or indefinite output.

Figure 6:
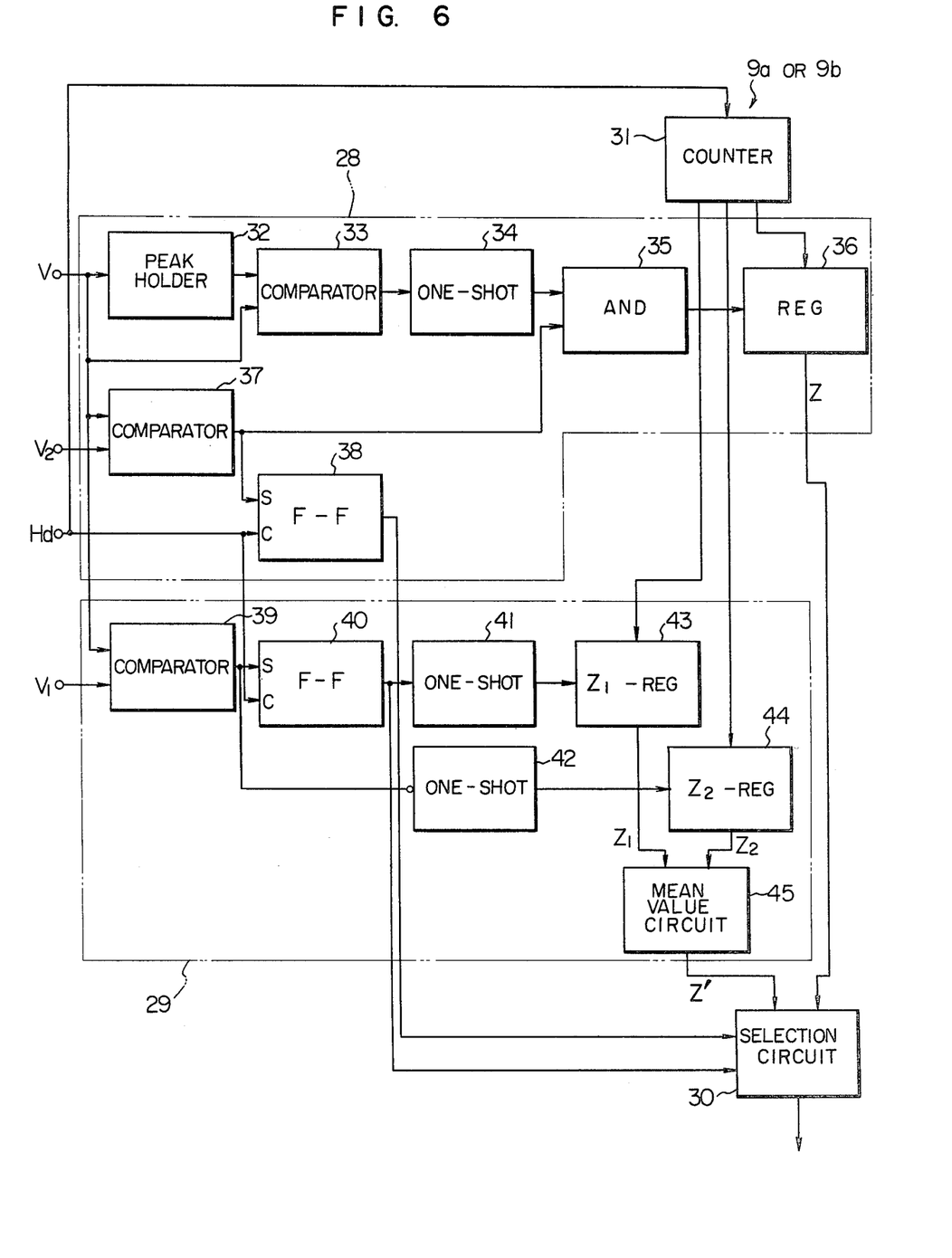
FIG. 6 shows a specific example of the light segment extracting circuit shown in FIG. 4.

FIG. 6 shows further detail of the embodiment of FIG. 4. The operation is now explained in detail with reference to FIG. 6.

The maximum value position detection circuit 28 comprises a peak holder 32, a comparator 33, a one-shot circuit 34, an AND circuit 35, a register 36, a comparator 37 and a flip-flop 38. The center position detection circuit 29 comprises a comparator 39, a flip-flop 40, one-shot circuits 41 and 42, a $Z_1$-register 43, a $Z_2$-register 44 and a mean value circuit 45. A counter 31 for indicating a z-position at respective instant is provided. In the maximum value position detection circuit 28, the video signal V is applied to the peak holder 32 which holds a peak value of V in a predetermined time period in each scan period. The comparator 33 compares the held peak value with V at the last instant of the predetermined period, and if V is higher than the held peak value by more than a predetermined magnitude, it provides a signal to the one-shot circuit 34. On the other hand, V is compared with $V_2$ in the comparator 37 which produces an output when $V \geq V_2$. This output is ANDed with the output of the one-shot circuit 34 in the AND circuit 35 so that a moment at which $V \geq V_2$ and V is peak can be detected. This detection signal is used as a load signal for the register 36 which stores the content of the counter 31 at that moment. The counter 31 is reset by a trigger signal Hd. Thus, at the end of each scan, the z-coordinate position Z at which the video signal V assumes the maximum value $V_{max}$ is held.

In the center position detection circuit 29, the video signal V is compared with the reference $V_1$ in the comparator 39, an output of which is applied to a set input S of the flip-flop 40, which is reset by the trigger signal Hd. Accordingly, the one-shot circuit 41 detects the moment at which the first $V \geq V_1$ condition occurs in each scan. This detection signal is used as a load signal for the register 43 so that the z-coordinate position $Z_1$ at which the first $V \geq V_1$ condition occurs is held in the register 43. On the other hand, the one-shot circuit 42 detects the moment at which the $V \geq V_1$ condition is lost. This detection signal is used as a load signal for the register 44 so that the z-coordinate position $Z_2$ at which the $V \geq V_1$ condition is lost is held in the register 44 at the end of each scan. Numeral 45 denotes a mean value circuit for calculating $Z=(Z_1+Z_2)/2$.

The output of the flip-flop 40 may be used to detect if the $V \geq V_1$ condition occurred in each scan. Since the flip-flop 38 receives the trigger signal Hd as a reset signal and the output of the comparator 32 as a set signal, it can detect if the $V \geq V_2$ condition occurred in each scan. The selection circuit receives those signals as a conditioning signal to produce the value Z held in the mean value 45 when the $V \geq V_1$ condition occurs, the value Z held in the register 36 when $V_2 < V \leq V_1$ and zero or indefinite output signal when the $V \geq V_2$ condition does not occur.

In the embodiments shown in FIGS. 4 and 6, the respective means are hardware implemented. Alternatively, those means may be implemented by a microcomputer and a program.

The construction described above is very effective in extracting the light segment from the two-dimension light segment image having large changes in the brightness which is derived from an object having partial glazing areas such as the soldered area. Particularly when the slit image is projected to a three-dimensional object having a spherical surface such as soldered area, the light segment images produced by the image detectors 4a and 4b are not of symmetric waveforms as shown in FIG. 5a. Accordingly, by detecting the position corresponding to $V_{max}$, a real cross-sectional area of the three dimensional object can be detected. However, if the light segment image is too bright to saturate the image detectors 4a and 4b, the peak position cannot be detected. By thresholding the signal at $V_1$ and extracting the center position $(Z_1+Z_2)/2$, the erroneous extraction of the light segment can be prevented. A dead angle may be created by the lead wire or the like and the image detectors 4a and 4b may detect the light segment image which is darker than $V_2$. In the present embodiment, the light segment is not extracted at the portions which are darker than $V_2$. Accordingly, the erroneous detection due to noise can be prevented. This is a desirable feature for automatic shape measurement and automatic shape test.

Figure 7:
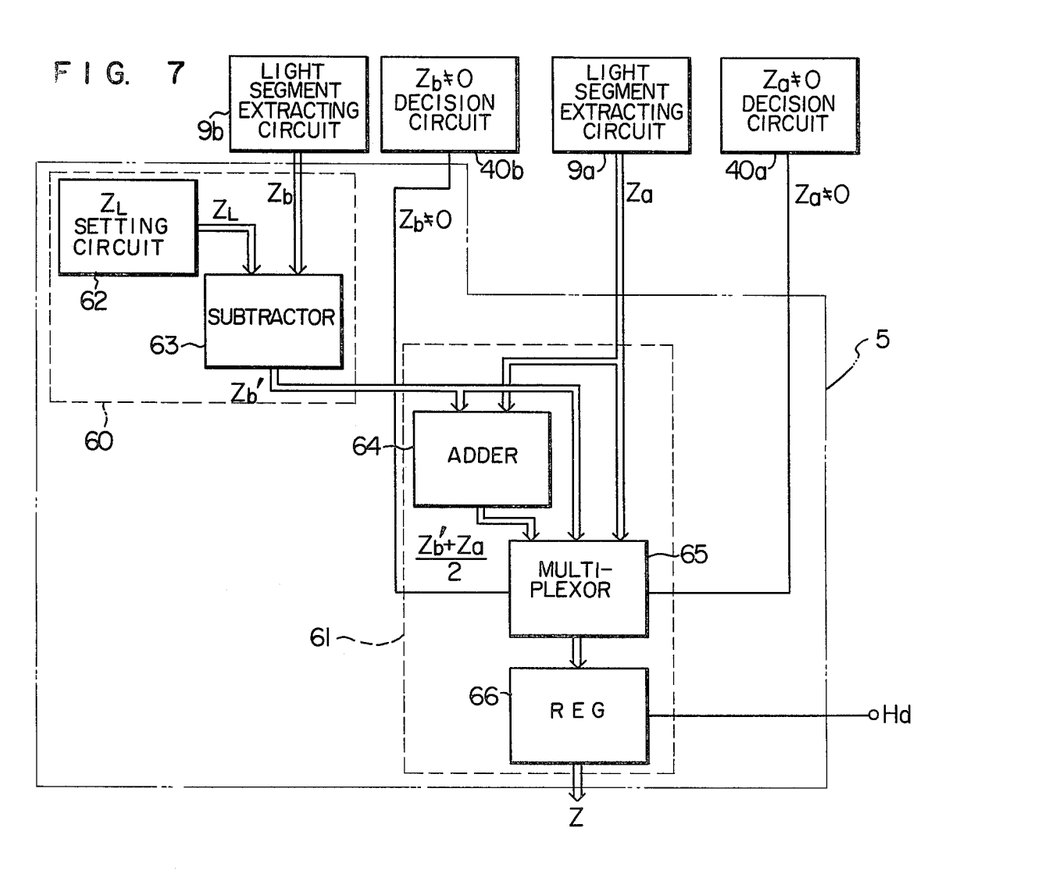
FIG. 7 shows an adder circuit shown in FIG. 1.

Since the light segment images detected by the image detectors 4a and 4b are opposite to each other, the coordinate $Z_b$ of the light segment produced by the light segment extracting circuit 9b must be inverted in the adder circuit 5 before it is combined with the coordinate $Z_a$ of the light segment produced by the light segment extracting circuit 9a. Thus, the adder circuit 5 comprises an inverter circuit 60 and an adder circuit 61. The inverter circuit 60 comprises a setting circuit 62 for setting a detection region $Z_L$ and a subtractor 63 and it carries out an operation of $Z_{b'}=Z_L-Z_b$. The adder circuit 61 comprises an adder 64, a multiplexor 65 and a register 66. The adder 64 carries out an operation of $(Z_{b'}+Z_a)/2$ and the multiplexor 65 selects an output of $Z=(Z_{b'}+Z_a)/2$ when $Z_a \neq 0$ and $Z_b \neq 0$, an output of $Z=Z_{b'}$ or $Z=Z_a$ when $Z_a=0$ or $Z_b=0$, and an output of $Z=0$ when $Z_a=0$ and $Z_b=0$. The selected output is held in the register 66 which is reset by the synchronizing signal Hd. In this manner, a dead angle free light segment output can be produced.

Figure 8:
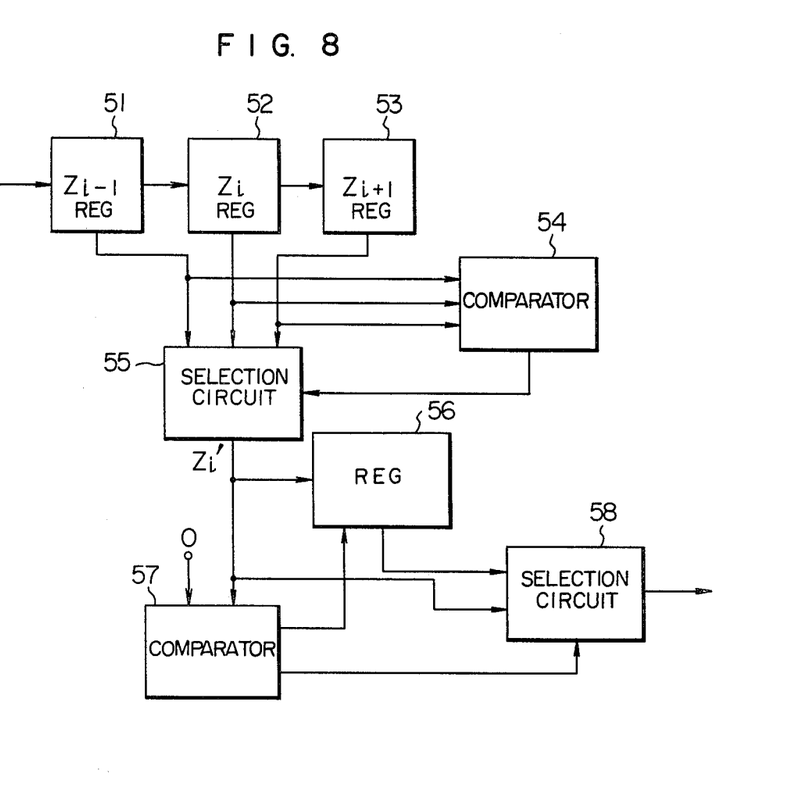
FIG. 8 shows a waveform preprocessing circuit shown in FIG. 1.
Figure 9:
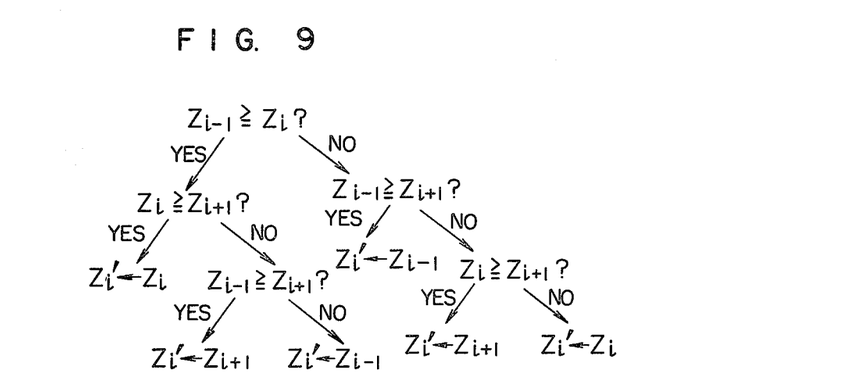
FIG. 9 illustrates function of medium value filtering in the circuit shown in FIG. 8.
Figure 10A:
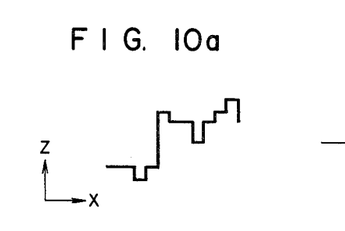
FIGS. 10a and 10b show examples of processing of medium value filtering.
Figure 10B:
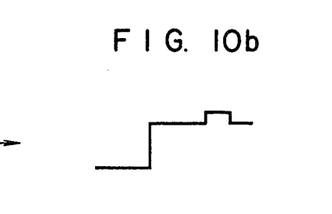
Figure 11A:
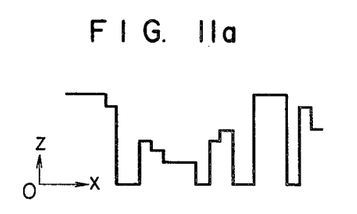
FIGS. 11a and 11b show an example of processing for illustrating function of connecting a broken line.
Figure 11B:
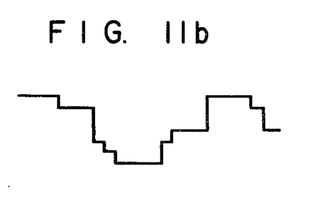

The waveform preprocessing circuit 10 carries out noise processing for the light segment waveform extracted by the adder circuit 5 and connecting process of a broken line. FIG. 8 shows an embodiment thereof. The circuit shown in FIG. 8 comprises four registers 51, 52, 53 and 56, two comparators 54 and 57 and two selection circuits 55 and 58. The elements 51 to 55 carry out medium value filtering process for processing noise and the elements 56 to 58 carry out stepwise interpolation for connecting the broken line. The light segment waveforms are produced as a time sequence signal by the light segment extracting circuits 9a and 9b. Those signals are applied to the three registers 51, 52 and 53 so that they are sequentially shifted in the registers. Assuming that the contents of those registers are $Z_{i-1}$, $Z_i$ and $Z_{i+1}$ as shown in FIG. 8, the magnitudes of those values are compared by the comparator 54 and a medium value is selected as an output $Z_i'$ by the selection circuit 55. The function of the circuits 54 and 55 is illustrated in FIG. 9. This enables the noise processing of the data waveform as shown in FIG. 10, in which FIG. 10a shows an input waveform and FIG. 10b shows an output waveform. The connection of the broken line is carried out in the following manner. The comparator 57 checks if $Z_i'=0$ or not, and if $Z_i' \neq 0$ that value is held in the register 56 and also selected by the selection circuit 58. When $Z_i'=0$, the value held in the register 36 is selected by the selection circuit 58 while the register 56 keeps the previously held value. In this manner, the broken line is connected. FIG. 11 shows an example of processing, in which FIG. 11a shows an input waveform to the comparator 57 and FIG. 11b shows an output waveform from the selection circuit 58. The waveform preprocessing circuit 10 is not necessary when the object has a stable rough surface but it is essential when the object has brazing surfaces such as soldered area. In addition to the illustrated medium value filtering and stepwise interpolation, many other processes such as filtering process or linear interpolation may be used as the waveform preprocessing.

The output from the waveform preprocessing circuit 10 is analyzed and evaluated by the determination circuit 11. If it is determined unacceptable, the X-Y coordinates thereof and a type of defect are stored in the external memory 13, which may be a cassette magnetic tape, a floppy disk or a paper tape which is used to store data to be used in a correction operation after the test. After one test area has been tested, the test moves to the next text point in accordance with the data stored in the external memory 16.

Figure 12A:
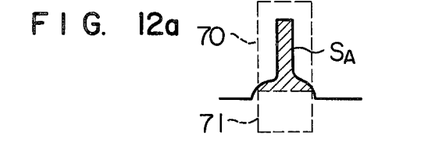
FIGS. 12a to 12c show an example of determination process.
Figure 12B:
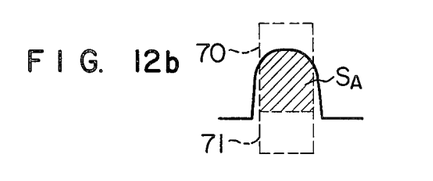
Figure 12C:
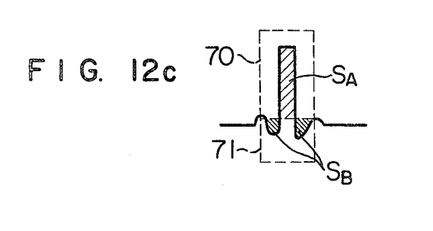

The construction of the determination circuit 11 differs depending on the object to be tested and a test specification therefor. As an example, a method for determining oversoldering and undersoldering in the soldered area test of the printed circuit board. The determination is carried out by a mini-computer or a micro-computer, or it may be replaced with an exclusively designed hardware circuit. FIG. 12 shows an example of the determination process, in which FIG. 12a shows an acceptable object, FIG. 12b shows an unacceptable oversoldered object and FIG. 12c shows an unacceptable undersoldered object. Test areas 70 and 71 shows by broken lines in FIG. 12 are set for the respective input waveforms and areas $S_A$ and $S_B$ in the test areas are determined. These areas are compared with preset allowable values $S_{AO}$ and $S_{BO}$, and if $S_A \geq S_{AO}$ or $S_B \geq S_{BO}$ an oversoldering output or an undersoldering output is produced, respectively.

While the evaluation is made based on the combined signal from the adder circuit 5, of the two light segment waveforms detected by the two image detectors 4a and 4b, those waveforms are not necessarily combined but the soldered area may be determined unacceptable if either one of the waveforms is detected as unacceptable. By testing the object from the both sides thereof, one detector can detect correctly even if the other detector is affected by a dead angle and hence the erroneous determination due to the dead angle can be prevented.

Figure 13A:
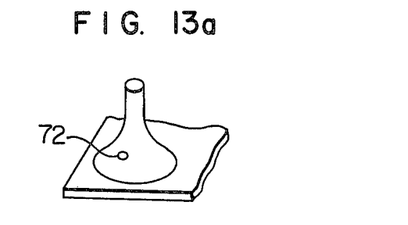
FIG. 13a illustrates the generation of a blow hole.
Figure 13B:
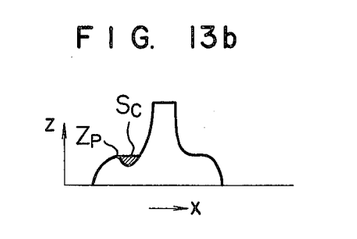
FIG. 13b illustrates a method for determining the size of the blow hole.

If a test item relates to a defect which cannot be tested by a single slit image such as a local blow hole 72 shown in FIG. 13a, an area $S_C$ of a portion which falls below a peak point $Z_p$ shown in FIG. 13b is determined, and the X-Y table is stepped at a small increment in Y-direction and determine a volume so that the acceptance can be determined from the overall data.

Figure 14:
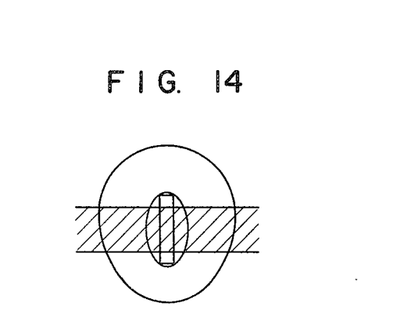
FIG. 14 shows a method for testing a soldered area on an IC.

In the embodiments shown, fine point adjusting mechanisms must be arranged at the junctions of the slit projector 3 and the image detectors 4a and 4b, and the head holding mechanism 6, although they are omitted in FIG. 1. When there is no possibility of creating the dead angle for the object (for example, when the soldered area of the IC lead wire (rectangular cross-section) shown in FIG. 14 is tested for the hatched area, no dead angle is created), only one of the image detectors 4a and 4b may be used. In this case, only one of the light segment extracting circuits 9a and 9b is needed and the adder circuit 5 is not necessary.

When the sectional area of the lead wire is circular or square, the entire surface of the soldered area must be tested and in this case a dead angle is created.

The angle between the slit projector 3 and the image detector 4a or 4b is practically 45° to 60°.

In the illustrated embodiment, when the unacceptable output is produced by the evaluation, it is applied to the external memory 13. Alternatively, a marking device may be added to mark at the corresponding area on the object to be tested.

As described hereinabove, according to the present invention, the test of the external view of the miniature three-dimensional object such as the test for the soldered area of the printed circuit board, the test for the component mounted on the printed circuit board or the test for the bump in the LSI bonding process, which heretofore has to be relied on manual operation, can be accurately automated.

We claim:

1. A shape detecting apparatus comprising:
   (a) a slit projecting means for projecting a slit image on a three-dimensional object;
   (b) a positioning means for positioning said three-dimensional object relative to said slit projecting means;
   (c) an image pickup means for two-dimensionally scanning the slit image projected by said slit projecting means to pickup the image;
   (d) a light segment extracting circuit including
       a center position extracting means for extracting a mean position $(Z_1+Z_2)/2$ of two position signals $Z_1$ and $Z_2$ at which a video signal derived by transversely scanning said slit image by said image pickup means corresponds to or approximates to a first higher reference $V_1$ when a maximum value of said video signal exceeds said first higher reference $V_1$,
       a maximum value position extracting means for extracting a position Z corresponding to the maximum value of said video signal when the maximum value of said video signal is no higher than said first higher reference $V_1$ and exceeds a second lower reference $V_2$, and
       an erasing means for erasing the position signal of said video signal when the maximum value of said video signal is no higher than said second lower reference $V_2$; and
   (e) a detecting means for detecting a shape of said three-dimensional object by analyzing the light segment position information derived from said light segment extracting circuit.

2. A shape detecting apparatus according to claim 1 further comprising a waveform preprocessing means for comparing said light segment position $Z_i$ and adjacent light segment positions $Z_{i-1}$ and $Z_{i+1}$ on both sides thereof to select the least changing value as a light segment position $Z_i'$ in order to erase noises and interpolating with one of said adjacent light segment positions $Z_{i-1}'$ and $Z_{i+1}'$ when said light segment position $Z_i'$ is zero.

3. A shape detecting apparatus according to claim 2 wherein said slit projecting means is arranged to project the slit image perpendicularly to said three-dimensional object and said image pickup means includes a first image pickup means and a second image pickup means arranged to pickup the image obliquely on both sides of the center of said three-dimensional object.

4. A shape detecting apparatus according to claim 3 wherein said light segment extracting circuit includes two means to correspond to said first and second image pickup means, respectively.

5. A shape detecting circuit according to claim 4 further comprising an adder means for inverting the position signal derived from one of said light segment extracting means and combining the inverted position signal with the position signal derived from the other light segment extracting means.

6. A shape detecting apparatus according to claim 1 wherein said object is a soldered area and said detecting means defines a plurality of detection areas and determines areas of the respective detection areas to determine undersoldering and oversoldering.

* * * * *